(No Model.)
S. D. HALLEY.
HINGE.
No. 270,880. Patented Jan. 16, 1883.
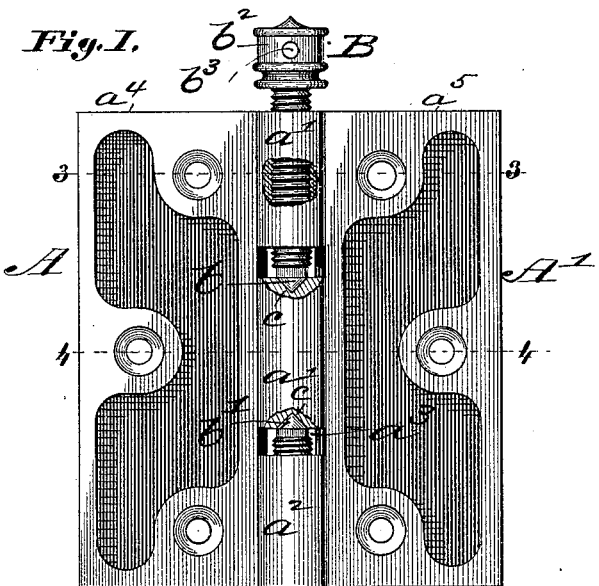
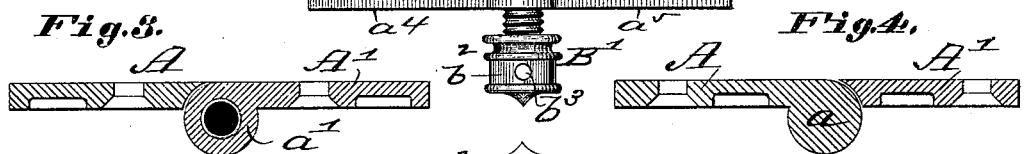
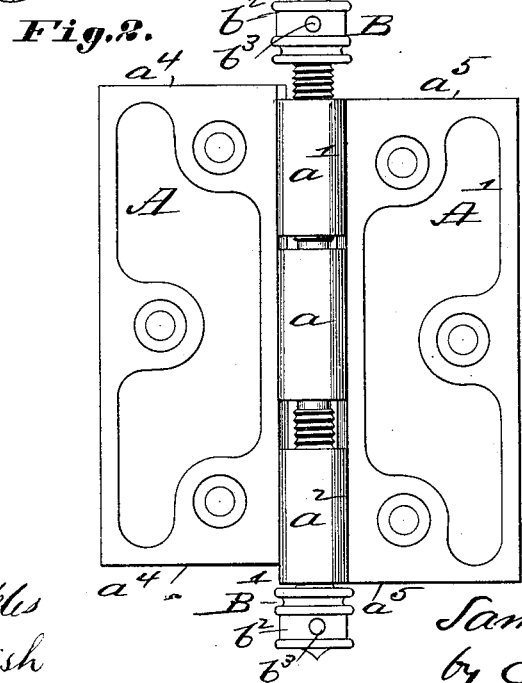
Attest:
Charles Pickles
Albert G. Fish
Inventor:
Samuel D. Halley
by C D Moody
atty

UNITED STATES PATENT OFFICE.

SAMUEL D. HALLEY, OF ST. LOUIS, MISSOURI, ASSIGNOR OF ONE-HALF TO CHARLES H. ALAPAW, OF SAME PLACE.

HINGE.

SPECIFICATION forming part of Letters Patent No. 270,880, dated January 16, 1883.

Application filed October 18, 1882. (No model.)

*To all whom it may concern:*

Be it known that I, SAMUEL D. HALLEY, of St. Louis, Missouri, have made a new and useful Improvement in Hinges, of which the following is a full, clear, and exact description, reference being had to the annexed drawings, in which—

Figure 1 is an elevation, partly in section, of the improved hinge; Fig. 2, an elevation; Fig. 3, a section taken on the line 3 3 of Fig. 1, and Fig. 4 a section taken on the line 4 4 of Fig. 1.

The same letters of reference denote the same parts.

The present invention is an improvement more especially in butt-hinges. It can, however, be embodied in other forms of hinges. The improvement relates to the mode of connecting and relatively adjusting the leaves of the hinge.

A A' represent the leaves of the hinge. The leaf A has the projection $a$, and the leaf A' has the projections $a'$ $a^2$, the projection $a$, when the leaves are connected, coinciding with the projections $a'$ $a^2$. The projections $a'$ $a^2$ are perforated to receive the screws B B', respectively, the screws engaging in the perforations and passing entirely through the projections $a'$ $a^2$, and at their points $b$ $b'$ bearing in the recesses $c$ $c'$, respectively, in the ends of the projection $a$. The projection $a$ is not as long as the space $a^3$ between the projections $a'$ $a^2$. This enables the leaves A A' to be relatively adjusted, so that the leaves can be exactly opposite each other, with the edges $a^4$ $a^4$ of the leaf A coinciding with the edges $a^5$ $a^5$ of the leaf A', or so that one leaf shall be higher or out of line with the other leaf. The leaves are shown in line in Fig. 1 and out of line in Fig. 2. The adjustment is effected by means of the screws B B'. When the leaves are in line the screws are adjusted in the projections $a'$ $a^2$ to hold the projection $a$ midway between the projections $a'$ $a^2$, and when it is desired to have the leaves out of line the screws are adjusted to hold the projection $a$ nearer to one of the projections $a'$ $a^2$ than to the other. In this manner a door, after being hung, can be adjusted vertically, the leaves to which the door is attached being, by means of the screws B B', operating as described, raised or lowered upon the other leaves until the desired adjustment is obtained. The extent to which the leaves A A' can be thus relatively adjusted is determined by the difference between the length of the projection $a$ and the length of the space between the projections $a'$ $a^2$.

Irrespective of the adjustment feature of the hinge, the present mode of uniting the two parts of the hinge is valuable, in that it enables the leaves of the hinge to work accurately upon each other. The screws B B' are of course closely held in the projections $a'$ $a^2$, and can, by suitably operating them, be made to bear properly in the recesses $c$ $c'$, and as the points $b$ $b'$ or recesses $c$ $c'$ become worn the screws can be readjusted and the proper working of the hinge maintained.

The beads $b^2$ of the screws can be finished in any desired style. The beads may be perforated at $b^3$ to enable the screws to be turned by a key.

I am aware that hinges having a vertically-adjustable pintle have heretofore been used.

I claim—

The herein-described hinge, consisting of the leaf A, having the projection $a$, the leaf A', having the projections $a'$ $a^2$, and the screws B B', the projection $a$ being shorter than the space between the projections $a'$ $a^2$, and the various parts being combined and operated substantially as described.

SAMUEL D. HALLEY.

Witnesses:
   C. D. MOODY,
   SAML. S. BOYD.